United States Patent [19]
Triesethau

[11] Patent Number: 5,282,710
[45] Date of Patent: Feb. 1, 1994

[54] COVERING DEVICE ALLOWING SIMPLIFIED FASTENING

[75] Inventor: Karl-Heinz Triesethau, Brensbach, Fed. Rep. of Germany

[73] Assignee: Firma Carl Freudenberg, Weinheim/Bergstr., Fed. Rep. of Germany

[21] Appl. No.: 929,624

[22] Filed: Aug. 13, 1992

[30] Foreign Application Priority Data

Oct. 23, 1991 [DE] Fed. Rep. of Germany ....... 4134937

[51] Int. Cl.5 .................. F16B 33/00; F16B 43/02
[52] U.S. Cl. .................. 411/544; 411/368; 411/155; 411/903
[58] Field of Search ............ 411/155, 156, 544, 533, 411/368, 369, 901, 902, 903, 907

[56] References Cited

U.S. PATENT DOCUMENTS

| | | | |
|---|---|---|---|
| 3,856,066 | 12/1974 | Reynolds | 411/155 |
| 3,910,588 | 10/1975 | Austin | 411/155 |
| 4,686,808 | 8/1987 | Triplett | 411/903 X |
| 5,112,178 | 5/1992 | Overhues et al. | 411/544 |

FOREIGN PATENT DOCUMENTS 44814 1/1939 Netherlands ................ 411/155

*Primary Examiner*—Neill R. Wilson
*Attorney, Agent, or Firm*—Kenyon & Kenyon

[57] ABSTRACT

A covering device comprising a cap of flexible material having at least one recess, that is penetrable by a fastening element. The recess is enclosed by a cup-spring-type area which is formed in one piece with the cap.

6 Claims, 5 Drawing Sheets

COVERING DEVICE ALLOWING SIMPLIFIED FASTENING

BACKGROUND OF THE INVENTION

The present invention relates to a covering device comprising a cap of flexible material having at least one recess, which during normal operational use is penetrated by a fastening element.

The aforementioned types of covering devices are generally known and are used for example, as protective devices on machine tools. In many applications, conventional covering devices require spring lock washers, plain washers, or expensive special screws, for example, to guarantee the screw clamping force required for a long service life and all types of stresses. Furthermore, conventional covering devices often require costly corrosion protection.

The object of the present invention is to provide an improved covering device of the type mentioned at the outset to attain simplified assembly and a greater reliability with respect to localizing the covering device on a component part to be covered, and which solves the aforementioned problems of conventional covering devices.

SUMMARY OF THE INVENTION

This objective is solved according to the present invention by providing a covering device to be fastened to a component to be covered by a fastening element comprising a flexible cap and a cup-spring-type area. The flexible cap has a recess which is able to be penetrated by the fastening element and has an axis. The cup-spring-type area is formed in one piece with the cap and surrounds the recess.

In the covering device according to the present invention, the cap includes a recess which is enclosed by a cup-spring-type area. The cup-spring-type area is formed in one piece with the cap. Since the assembly of the covering device of the present invention is advantageously particularly simple, spring lock washers, plain washers, or expensive special screws are not needed. The cup-spring-type area guarantees the reliable, secure fastening of the covering device to the component to be covered by providing the requisite screw clamping force over the entire service life of the cap. Depending upon the specific application conditions, metallic materials can be used, for example. The materials may be formed through shallow drawing. Manifestations of relaxation are negligibly small when metallic materials are used.

The covering device can also be designed, for example, as a bearing bracket for an engine mounting. For normal operational use of the engine mounting, the covering device in the form of a bearing bracket can be fastened, for instance, to the body and/or chassis of a motor vehicle.

The cap can have, at least in part, a corrosion-resistant surface (e.g., provided by a polymer coating). An advantageous refinement of the present invention provides that only the partial areas untouched by the fastening element are covered with a surface coating of polymer material. Due to the corrosion-resistance provided by the surface coating, the metallic material of the covering device does not have to be inherently resistant to environmental influences, such as moisture. Rather, the metallic material only needs to exhibit elastic qualities to ensure good working properties over a long service life. This refinement permits economical manufacturing of the covering device since a comparatively less expensive supporting material can be selected. The task of protecting the covering device from environmental influences is assumed by the surface coating on the partial areas of the surfaces which remain untouched by the connecting element that is used. As a result, the peripheral areas of the covering device can also be coated, whereby the coating is effectively formed in one piece to blend together. With this refinement, the covering device of the present invention is reliably fixed by means of the fastening element, since it is precisely those partial areas of the surface touched by a screwhead which are not provided with a surface coating. Therefore, manifestations of relaxation do not occur. The partial areas of the surface not covered by the fastening element are protected from outside influences by the surface coating.

The surface coating can be made of rubber, for example. The surface coating of rubber permanently protects the surface of the disk from mechanical damages, such as from broken stone as well as from environmental influences, such as moisture. The material of the surface coating is expediently selected based on the particular application requirements. Having the surface coating consist of rubber is particularly advantageous when the covering device is designed as a bearing bracket for accommodating an engine mount. The surface coating and a spring element made of flexible material provided for vibration damping/vibration isolation can be formed, for example, in one piece to blend into one another. This advantageously increases the productibility and durability of an engine mount provided with the covering device.

In addition, in the present invention, the cup-spring-type area exhibits at least two concentric hollow-conical disk areas, which surround on another. The two conical disk areas are combined into one piece. The radially outer disk area forms a first cone angle with a plane perpendicular to the axis of the recess. This first cone angle is smaller than a second cone angle defined by the inner disk area and the plane. This structure is particularly advantageous in the case of heavily stressed bolted joints. Further advantages with respect to the working properties of the covering device of the present invention are attained by including a radial groove, which is arranged in a transition region between the two disk areas on the surface of the covering device opposite the surface adjacent to the component to be covered. Further, the inner disk area has a surface that advantageously completely contacts the fastening element that is used when in the completely fastened state. The spring characteristic of the cup-spring-type area can be exactly ascertained in advance and the surface coating can be applied to a precisely defined area of the cap. The polymer surface coating, for example, can be impressed on an edge lying radially within the groove. Therefore, post treatment of the surface area which comes into contact with the fastening element is not needed.

The following describes the functioning of the covering device. When the cup-spring-type area is pressed in the direction of the longitudinal axis, the outer disk area, which shows less spring stiffness than the inner disk area, contacts the surface of the component to be covered, (e.g., a machine housing). When the cup-spring-type area is loaded further in the direction of the longitudinal axis, the inner disk area is then pressed onto the surface of the component to be covered, so that the entire cup-spring-type area contacts the opposite surface. To avoid manifestations of relaxation, the surface coating is only applied to the partial areas of the cap not contacted by the connecting element that is used. This guarantees an excellent, long-lasting joining of the interconnected machine elements. The surface areas beyond the contact points between the fastening element and the opposite surface are provided, on the side opposite the component, to be covered with a surface coating to protect the metallic cap material.

The surface coating can sealingly cover the groove thereby guaranteeing that the groove is not filled in with impurities which could adversely affect the working properties of the cup-spring-type area. This refinement effectively prevents corrosion, especially in this area.

DETAILED DESCRIPTION

Figure 1:
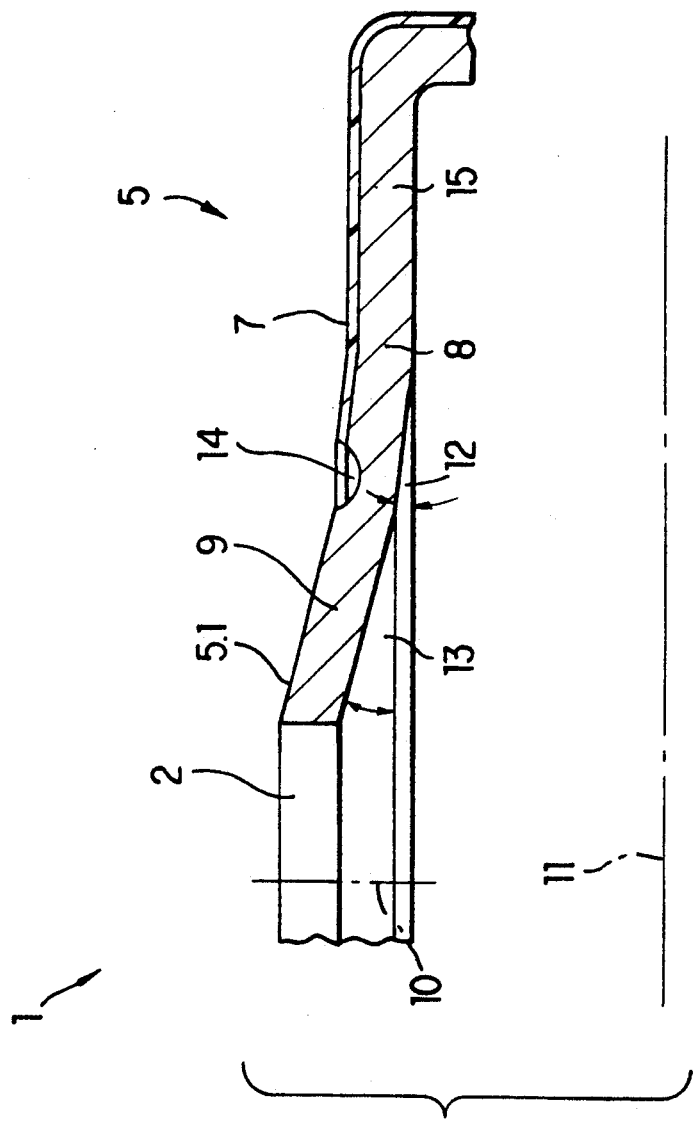
FIG. 1 is a cut-away portion of a covering device according to the present invention having a surface coating of polymer material in one section.
Figure 2:
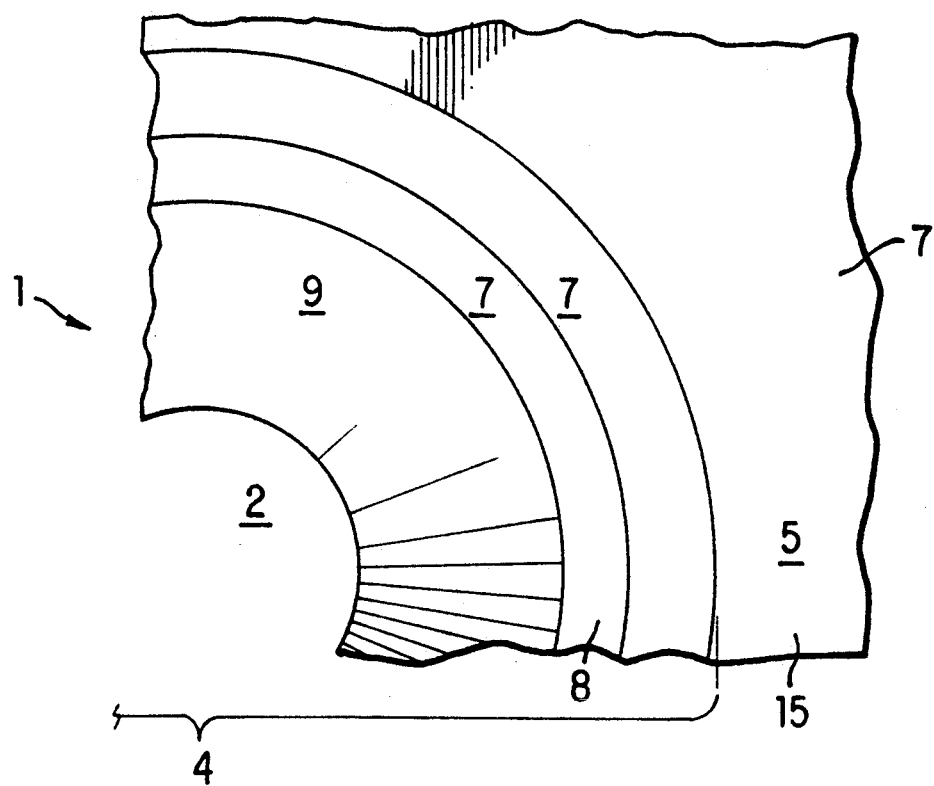
FIG. 2 is a plan view of the cut-away portion of the covering device of FIG. 1.

A covering device is depicted as a single part in FIG. 1. The covering device comprises a cap 1 of flexible material and a recess 2. The recess 2 is surrounded by a cup-spring-type area 4 (see FIG. 2) formed in one piece with the cap 1. The cap 1 has a covering area 15 arranged outside the cup-spring-type area in a direction radially away from the axis 10. The cup-spring-type area includes two concentric hollow-conical disk areas 8, 9. The disk areas 8, 9 surround one another and are combined into one piece. The outer disk area 8 exhibits less spring stiffness than the inner disk area 9. The outer disk area forms a first cone angle 12 with an imaginary plane 11. The inner disk area 9 forms a second cone angle 13 with the plane 11 which is larger than the first cone angle 12. Thus, when the cup-spring-type area is pressed in the direction of the axis 10, first the outer disk area 8 comes into complete contact with the surface of an component to be covered and, as the spring resilience increases further, the inner disk member 9 comes into complete contact with the surface of the component to be covered.

A groove 14, which promotes the advantageous working properties of the covering device, serves as a transition zone between the outer disk area 8 and the inner disk area 9.

Figure 5:
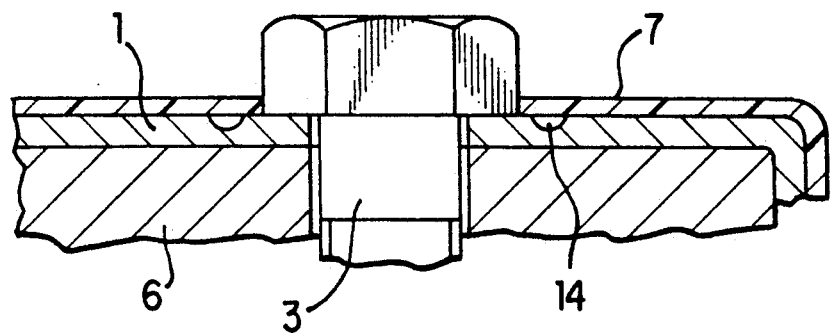
FIG. 5 shows an assembled covering device according to the present invention.

In the area of the surface 5, a surface coating 7 of polymer material is applied at the outer disk area 8, which also completely encompasses the groove 14 in the radial direction. The outer peripheral areas of the covering device are also protected by the surface coating 7. In a preferred embodiment of the present invention, when in the completely fastened state, a fastening element (e.g., a screw 3) exhibits a contact surface with the cup-spring-type area having the exact same area as the surface area of the inner disk area 9 that is not coated (see FIG. 5).

Figure 3A:
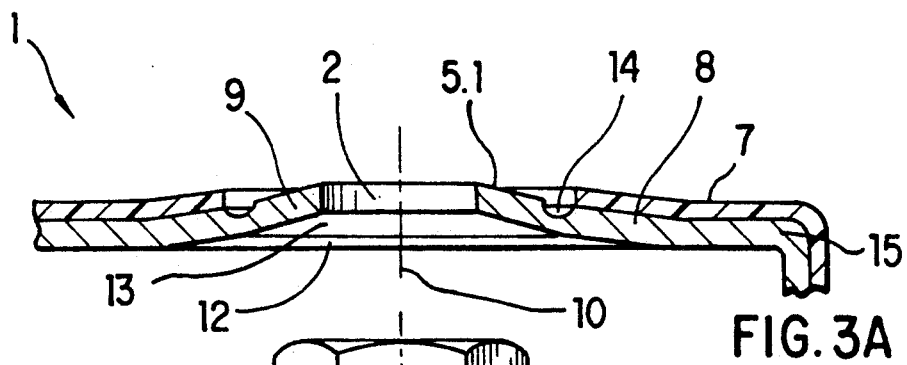
FIGS. 3(a)-3(c) illustrate three different load states of the cup-spring-type area when the cap is fastened with a fastening element.
Figure 3B:
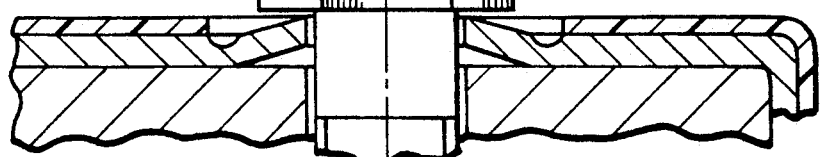
Figure 3C:
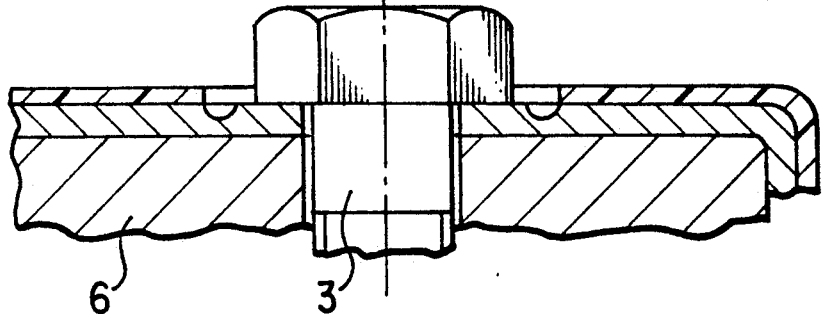

FIGS. 3(a)-3(c) depict the steps for installing the covering device on a component 6 to be covered according to the present invention. Clearly, the outer disk area 8 in the area of the opposite surface of the component 6 to be covered is initially placed on this component (see FIG. 3(a)). The spring resilience is subsequently increased by the greater spring stiffness of the inner disk area 9. In the installed state, the inner disk area also rests flat on the opposite surface of the component (see FIG. 3(c)). The prestress force required for a secure bolted joint is retained for the entire service life of the frictional connection and is also not curtailed by the application of a surface coating 7 of polymer material, nor by negative external influences, for example, on the metallic base material of the covering device.

Figure 4:
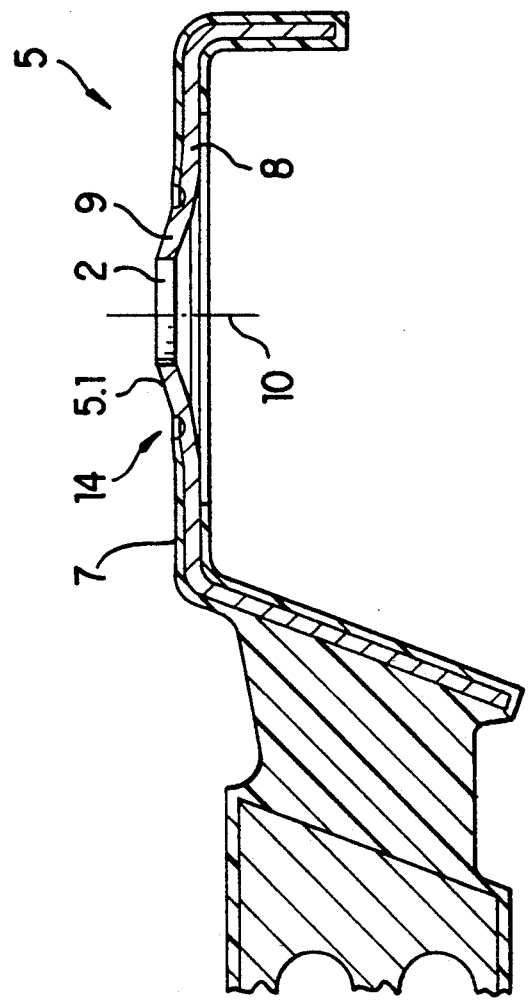
FIG. 4 depicts the covering device according to the present invention as a bearing bracket for accommodating an engine mount.

In FIG. 4, the covering device according to the present invention is designed as a bearing bracket for accommodating and engine mount. The surface coating 7 of polymer material is formed in one piece to blend with a spring element provided for vibration isolation/vibration damping of an attached machine element. A bearing bracket designed in this manner is easily produced and the surface coating 7 provides excellent protection from outside influences as well.

The covering device according to the present invention can be applied in widely varying areas of technology. It represents an inexpensive machine element that is easy to manufacture that can be applied in diverse areas, and which has good working as well as an excellent service life.

I claim:

1. A covering device to be fastened by a fastening element to a component to be covered, wherein said covering device comprises:
   a) a covering area for covering said component to be covered;
   b) a cup-spring-type area surrounding a recess for receiving said fastening element; and
   c) a coating, said coating being applied to a portion of an upper surface of said covering device thereby protecting said portion of said upper surface of said covering device from corrosion.

2. The covering device according to claim 1, wherein said coating comprises a polymeric material.

3. The covering device according to claim 1, wherein said coating is comprised of rubber.

4. A covering device to be fastened by a fastening element to a component to be covered, wherein said covering device comprises:
   a) a covering area for covering said component to be covered; and
   b) a cup-spring-type area surrounding a recess for receiving said fastening element;
   wherein said cup-spring-type area comprises a first and a second hollow-conical disk area, said first and second hollow-conical disk areas being concentric, said first hollow-conical disk area surrounding said second hollow-conical disk area, said first and second hollow-conical disk areas being combined into one piece, said first hollow-conical disk area forming a first cone angle with a plane perpendicular to an axis of said recess, and said second hollow-conical disk area forming a second cone angle with the plane, said second cone angle being larger than said first cone angle.

5. The covering device according to claim 4, wherein said covering device further comprises a groove, said groove being arranged in a transition region between said first and second hollow-conical disk areas and wherein said second hollow-conical disk area has an upper surface capable of being completely contacted by said fastening element.

6. The covering device according to claim 5, further comprising:

c) a coating sealingly covering said groove.

* * * * *